No. 639,962. Patented Dec. 26, 1899.
L. M. DEVORE.
FASTENER FOR CORDS.
(Application filed Apr. 1, 1899.)
(No Model.)
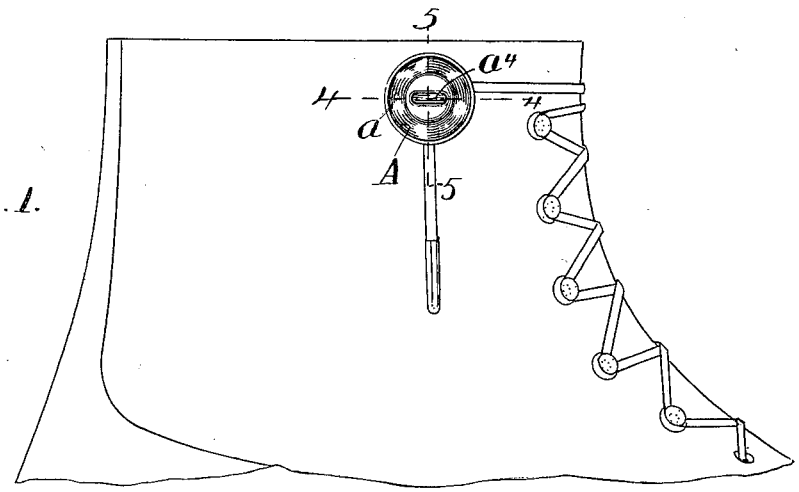
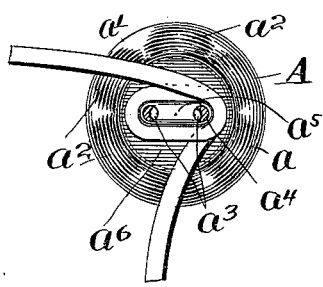
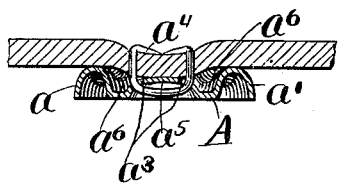
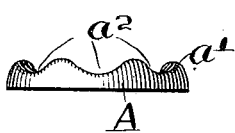
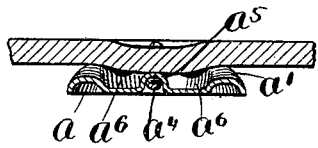
Witnesses:
Chas. O. Shervey,
S. Bliss.
Inventor:
Levi M. Devore
by Wilkinson & Fisher
Attys.
THE NORRIS PETERS CO., PHOTO-LITHO., WASHINGTON, D. C.

United States Patent Office.

LEVI M. DEVORE, OF FREEPORT, ILLINOIS.

FASTENER FOR CORDS.

SPECIFICATION forming part of Letters Patent No. 639,962, dated December 26, 1899.

Application filed April 1, 1899. Serial No. 711,374. (No model.)

*To all whom it may concern:*

Be it known that I, LEVI M. DEVORE, a citizen of the United States of America, residing at Freeport, in the county of Stephenson and State of Illinois, have invented certain new and useful Improvements in Fasteners for Cords, of which the following is a specification.

My invention relates to certain improvements in a fastener for cords, &c., the object being to produce a simple fastener which may be easily attached to the object upon which the cords are to be fastened and will securely hold the ends of the cords against disengagement.

The invention is illustrated in the accompanying drawings by means of five figures, of which—

Figure 1 is a side elevation of the fastener applied to a shoe and adapted to secure the ends of the shoe-strings. Fig. 2 is a rear view of the fastener. Fig. 3 is an edge view thereof. Fig. 4 is a horizontal section in line 4 4 of Fig. 1, and Fig. 5 is a vertical section in line 5 5 of Fig. 1. Figs. 2 to 5 are upon an enlarged scale to more clearly illustrate the invention.

The fastener is composed of a plate A, preferably circular and formed about its margin with a depression $a$, said depression extending from the front face of the fastener rearward toward the object to which it is attached and forming an inclosing flange $a'$, in which are formed a series of corrugations $a^2$. Openings $a^3$ are provided, by which it may be readily attached to an object (here shown as a shoe) by sewing it thereto or stapeling it, as seen in the drawings at $a^4$. The plate is preferably formed with a longitudinal depression $a^5$, extending across the openings $a^3$ and adapted to form a post around which the cord is wrapped in the use of the fastener and also to permit the bend of the staple to lie therein and brace the fastener.

When the fastener is secured in place upon the shoe or other article, an annular space $a^6$ is formed between the flange $a'$ and the post $a^5$, and in this space the cord is confined. In securing a cord upon the fastener it is wrapped around the post until the end passes by the portion entering. The cord immediately adjusts itself, so that the entering portion and the end pass through two of the corrugations and the end portion is wedged in the annular space $a^6$ and prevented from accidental disengagement. To disengage the cord, it is merely unwrapped from the post.

It is evident that this fastener is equally as applicable to gloves or other wearing-apparel, bags, and in fact all places where it is desirable to fasten the ends of cords, which ordinarily is done by tying them together in a knot.

I claim as new and desire to secure by Letters Patent—

A fastener for cords and the like, comprising a plate formed with a central post, an annular space around said post and a series of marginal corrugations about the space; substantially as described.

In witness whereof I have hereunto set my hand at Freeport, in the county of Stephenson and State of Illinois, this 25th day of March, A. D. 1899.

LEVI M. DEVORE.

Witnesses:
H. H. ANTRIM,
H. A. MEYER.